United States Patent [19]

Miller et al.

[11] Patent Number: 5,175,859
[45] Date of Patent: Dec. 29, 1992

[54] APPARATUS FOR DISABLING UNUSED CACHE TAG INPUT/OUTPUT PINS DURING PROCESSOR RESET BY SENSING PULL-DOWN RESISTORS CONNECTED TO DISABLED PINS

[75] Inventors: Michael J. Miller, Saratoga; Philip A. Bourekas, Sunnyvale; Avigdor Willenz, Campbell, all of Calif.

[73] Assignee: Integrated Device Technology, Inc., Santa Clara, Calif.

[21] Appl. No.: 517,293

[22] Filed: May 1, 1990

[51] Int. Cl.⁵ .............................................. G06F 1/22
[52] U.S. Cl. ..................................... 395/800; 307/465; 364/DIG. 1; 364/260.8; 364/280.2; 395/500
[58] Field of Search ............... 307/243, 465; 395/500, 395/800

[56] References Cited

U.S. PATENT DOCUMENTS

| | | | |
|---|---|---|---|
| 4,432,049 | 2/1984 | Shaw et al. | 395/800 |
| 4,987,319 | 1/1991 | Kawana | 307/465 |
| 5,051,622 | 9/1991 | Pleva | 307/465 |

Primary Examiner—Thomas C. Lee
Assistant Examiner—Richard Lee Ellis
Attorney, Agent, or Firm—Thomas E. Schatzel

[57] ABSTRACT

A method of programming a cache tag comparator by designing a semiconductor device's internal circuitry such that an input/output pin of the device may be programmed by an external resistor to ground that will indicate during the reset phase of the device that an alternate function for the pin is to be selected or that the pin itself is to be disabled.

5 Claims, 1 Drawing Sheet

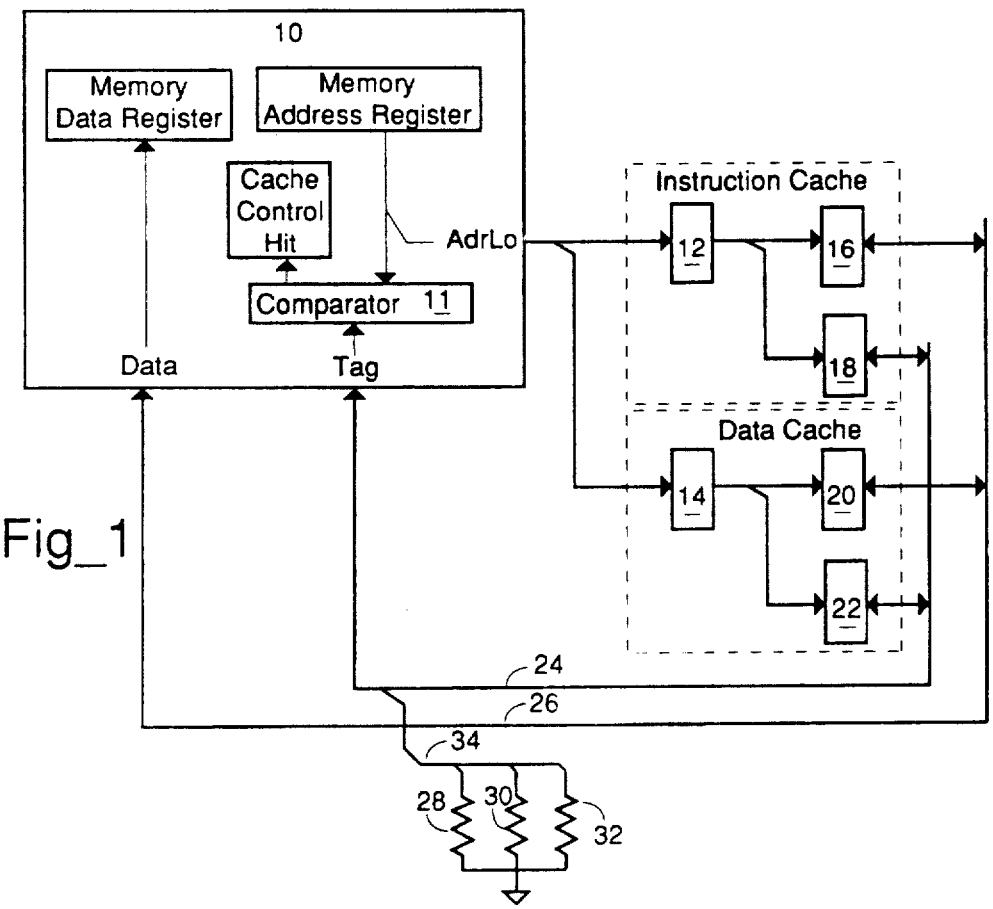
Fig_1
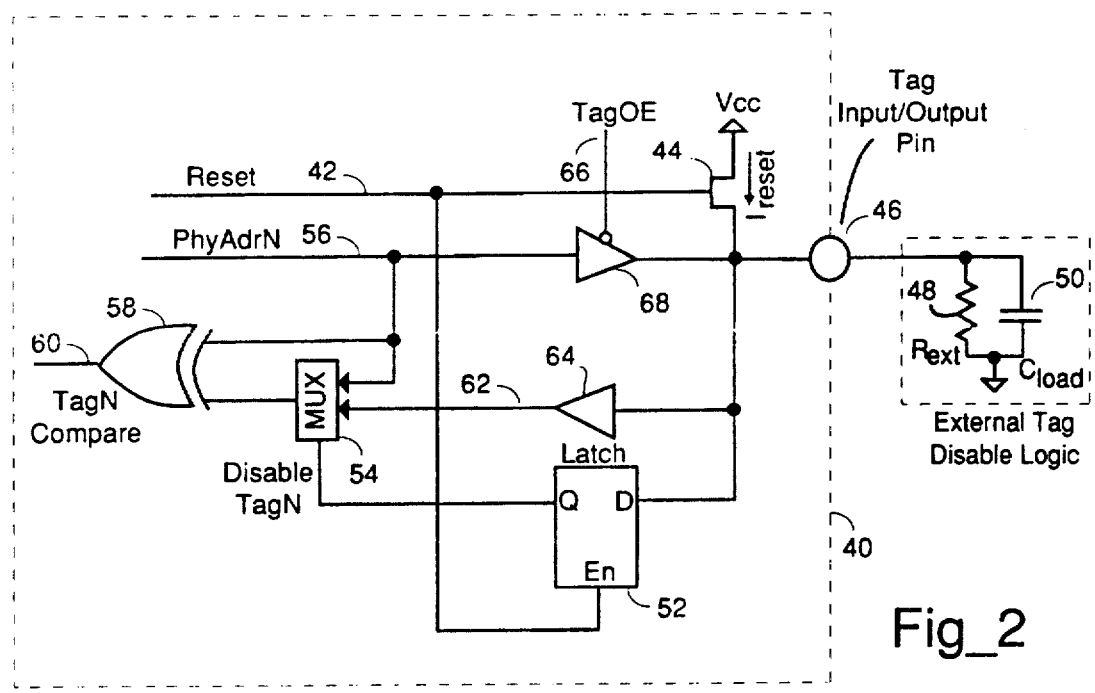
Fig_2

APPARATUS FOR DISABLING UNUSED CACHE TAG INPUT/OUTPUT PINS DURING PROCESSOR RESET BY SENSING PULL-DOWN RESISTORS CONNECTED TO DISABLED PINS

BACKGROUND OF THE INVENTION

1. Field of the Invention

The invention relates generally to electronic circuitry and more particularly to digital circuit design techniques in semiconductor devices and computer systems.

2. Description of the Prior Art

Modern high-performance microprocessors employ fast local memory as a cache reservoir of the most often accessed instructions and data. The resulting reduction in effective main memory access times produces higher system performance. In many types of systems, one example being workstations, the parts count and system cost are secondary features to performance. But in other applications, such as the embedded processors in laser printers, system cost is a prime consideration.

One such modern high-performance microprocessor is the Integrated Device Technology, Inc., IDT79R3000. The IDT79R3000 has an on-chip cache control that supports a "direct mapped" cache. In direct mapping, each word of the physical memory space is mapped into one cache memory location. The "n" least significant bits (LSB) of the memory address are used to index the direct mapped cache to specify a unique word. In this context, "n" is the number of address lines used to access the cache memory. Since the R3000 can address 32 Megabytes of memory, each cache location can contain the contents of one of the $2^{32}$-n physical locations in main memory. To identify the origin of the exact page of physical memory of a word which has been replicated in the cache, it is "tagged" by the 32-n most significant bits (MSB) of the main memory address. Consequently, each cache memory location stores both the data and the upper address bits of the physical main memory that the data is related to.

The tag is subsequently compared to the main memory addresses being output by the microprocessor, and if the tag matches, a cache "hit" is said to have occurred. If a cache miss occurs, the data will not be found in the cache and an access of the main memory must be attempted instead. A cache hit means that data will be accessed faster because the duplicate data found in the cache memory will respond much faster than would the original data in main memory.

The cache subsystem of a typical IDT79R3000 implementation is logically comprised of three parts: 1) memories containing data and/or instructions being cached from main memory, 2) memories which contain tags that indicate the page number of a cached word, and, 3) a comparator that compares each Physical Frame Number (PFN) generated by the on-chip Memory Management Unit (MMU) with the tag data read from the tag memory.

Specialized memories and extensive logic to control the cache are not required with the IDT79R3000 cache subsystem, because standard Static Random Access Memory (SRAM) components are adequate. The IDT79R3000 has separate control pins for the instruction cache controls: IRd, IWr, and IClk; and for the data cache controls: DRd, DWr, and Dclk. This enables the separation of instruction and data caches without the need for external decoding logic.

The IDT79R3000 has overlapping, but separate, pins for the 6 MSB bits of its "AdrLo" port and the 6 LSB bits of physical frame number (PFN) that enable each cache size to be independently varied from 4 Kb to 256 Kb. It also has a "Harvard" architecture which achieves high performance by overlapping load/store operations with the instruction fetch and execution.

A typical IDT79R3000's cache interface addressing is comprised of 10 bits of the virtual page address. Bits 0-1 of the offset are not connected to the cache memory since the IDT79R3000 accesses only 32 bit words from the cache. Since the ID79R3000 has instructions to access bytes or half words from memory, a whole word is read from the cache and, during read operations, the desired portion is automatically extracted, and then during write operations, the modified portion is merged and the whole word is written back.

The number of bits needed to tag memory pages is a function of the maximum cacheable memory size and the cache size. If a cache size of 4K bytes is used with the R3000 in a specific design and a cacheable memory space of 4 gigabytes is assumed then, the number of tag bits required is 20 bits (log base-2 of the size of the memory, divided by the cache size). In systems which do not utilize all of the 4 Gb address space, or in systems with more than 4 Kb of cache, less than 20 bits of cache tagging would be required. In such a case, the upper bits of the cache tag will always have the same value stored in them. But because the ID79R3000 processor compares the PFN to all 20 tag bits, it is necessary to supply the processor with all unused bits as well.

The ID79R3000 can accommodate many different cache sizes and system memory sizes, but at the expense of requiring wide cache words and therefore fast, costly SRAM. For example, in systems which implement larger caches, only 32-n (where n is log base-2 of the cache size) are actually required to identify the origin of the word from memory; however, the ID79R3000 uses the whole 20-bit page number as a tag for all cache sizes. Thus, for larger caches, the ID79R3000 compares more tag bits than would otherwise be needed to support a larger cache size.

In an application where the cache size is 128 Kb, the address for the cache will be 17 bits wide (n=17). All memory words of the selected page of the physical main memory with the same 17 LSB address bits (0-16) are respectively mapped into the same order within the cache. In this configuration, bits 12-16 are redundant if carried as tag bits as required by the R3000 tag comparator bus; these bits are actually used to address a unique cache memory location directly, and so do not need to be stored as a tag word. Notwithstanding the fact that only 15 bits are needed with a 128 Kb cache to "tag" the cache words (because 32−n=15), an ID79R3000 must use all 20 bits of the page number to determine whether a cache hit has occurred.

Table I shows the redundant tag bits that will occur for several different possible cache sizes a systems designer might select:

TABLE I

| Cache Size | AdrLo | Redundant address/tag bits |
| --- | --- | --- |
| 4Kb | 11:2 | none |
| 8Kb | 12:2 | 12 |
| 16Kb | 13:2 | 12-13 |
| 32Kb | 14:2 | 12-14 |
| 64Kb | 15:2 | 12-15 |
| 128Kb | 16:2 | 12-16 |

TABLE 1-continued

| Cache Size | AdrLo | Redundant address/tag bits |
|---|---|---|
| 256Kb | 17:2 | 12-17 |

Further complicating the situation is the IDT79R3000's requirement that not only must the redundant tag bits, 12-16, be returned to the IDT79R3000, they must be properly toggled to correspond to the portion of the 128 Kb cache addressed by those bits. A simple tying high or low of these lines would not be possible, even if the IDT79R3000's tag pins were simple inputs and not input/outputs.

Since redundant bits are always generated as part of a cache address, it is possible to feed the bits back to the tag comparator inputs through a buffer—rather than more expensively storing their values in the cache in tag memories. It would be desirable to make a further parts cost savings by disabling the participation of these bits in the tag comparison process and thus avoid the use of latches altogether. In microprocessors, such as the IDT79R3000, this is not possible because the system designer does not have access to the necessary points within the semiconductor circuit itself.

Similarly, most systems implement smaller main memory than the 4 gigabytes assumed by the R3000. In such systems, fewer tag bits should be required to uniquely map cache entries to their main memory origin. However, the R3000 still requires 20 tag bits to be supplied for comparison. One way to reduce a system's component parts count is to store the upper tag bits in an inexpensive register rather than in additional memories. Such a design choice could mean significant savings. As an example, if a design has 4 Mb of cacheable memory and a 64 Kb cache, that would mean eleven IDT6198 (16K×4) memories—eight for data, one for parity and two for the tag—would be needed. The tag memory would contain 6 tag bits (Ad16-Ad21, corresponding to the 1024 possible pages of the 4 Mb cacheable memory); a valid bit; and 2 tag parity bits. The high order tag bits (Ad22-Ad31) and the third tag parity bit (TagP2) would be supplied by a 10-bit register (e.g. IDT 74FCT821), which are loaded by the CPU and they indicate where—within the 4 Gb address space—the 4 Mb of cacheable memory resides. The low-order tag bits 12-16 are provided to the processor by a buffer (e.g. IDT 74FCT244A), which feeds the redundant AdrLo (bits into the processor tag comparator.

The superfluous, most significant tag address bits (with regards to main memory and cache size) can be calculated as follows:

$$SUPERFLUOUS\_TAG = 32 - log_2(mem\ size)$$

The total number of unique tag address bits that are required with regards to main memory and cache size can be calculated as follows:

$$UNIQUE\_TAG = Log_2(mem\ size) - Log_2(cache\ size)$$

In order to reduce the amount of local/cache memory, the systems designer must be able to select which address bits will participate in the comparison with data from the cache. Current cache controllers of microprocessors such as IDT79R3000 do not accommodate such a selection. The problem then to be solved is how to allow the systems designer to be able to program the tag bits without simultaneously adding significant cost to the designer's system or the manufacturer's production of the semiconductor chips, while not degrading system performance, and without requiring software to participate in programming. The solution will therefore achieve software independence across multiple systems with different memory configurations.

SUMMARY OF THE PRESENT INVENTION

It is therefore an object of the present invention to provide an improved method of providing for user programming of a semiconductor device's alternative functions.

It is a further object to provide an improved method of cache tag comparison in high performance microprocessor systems.

It is a further object to provide for software independence/compatibility in implementations of an improved cache tag comparison method in high performance microprocessor systems.

It is a further object to provide for no loss of systems performance in implementations of an improved cache tag comparison method in high performance microprocessor systems.

It is a further object to limit the number of device pins in semiconductor device implementations of an improved cache tag comparison method in high performance microprocessor systems.

Briefly, a preferred embodiment includes within a semiconductor device a circuit that will detect the presence of a pull-down resistor that is connected to ground during the system reset phase of a cache tag comparator, and, if pulled-down, will disable the participation of the respective bit in the cache tag comparison phase.

An advantage of the present invention is that the elimination of tag bits will save the average system a minimum of 4 high-speed RAM devices (assuming 7198's are used) with no loss in performance.

Another advantage of the present invention is that implementation of techniques to reduce the width of individual cache entries by reducing the number of tag bits which must be compared to achieve a cache "hit," are simplified.

Another advantage of the present invention is that a cache tag comparator's device pins, which are normally used to participate in cache tag comparisons, can be programmed by a systems designer to not participate in the comparison by inexpensively connecting the device pin to ground through a resistor.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is a block diagram of an external cache subsystem connected to a processor containing a comparator circuit embracing the present invention;

FIG. 2 is a circuit diagram detail according to the embodiment shown in FIG. 1.

DETAILED DESCRIPTION OF THE PREFERRED EMBODIMENT

Referring to FIG. 1, a processor 10 address bus "AdrLo" output is connected to a latch 12 and a latch 14. The latch 12 and a memory 16 and a memory 18 form an "instruction cache." The latch 14 and a memory 20 and a memory 22 form a "data cache." Tag data from memories 18 and 22 and addresses from the cache tag comparator 10 input are exchanged over a bus 24. Data from memories 16 and 20 are exchanged with the "Data" port of the cache tag comparator 10 over a bus 26. Tag programming resistors 28, 30, and 32 connect to the unused (superfluous/redundant) portion of the "Tag" port of the cache tag comparator 10 over a bus 34.

Each "Tag" port of the cache tag comparator 11 in FIG. 1 is comprised of a tag structure 40, shown in FIG. 2. During the reset phase of the cache tag comparator 11, an internal reset, a line 42, will turn-on a transistor 44. The resulting current, "$I_{reset}$," will pull-up a pin 46. The pin 46 will rise to a logic one if a resistor 48 is not present. The pin 46 will remain a logic zero if the resistor 48 is present. A capacitive load 50 represents the stray capacitance on pin 46.

The logic condition of pin 46 is latched by a latch 52 when line 42 goes false. If the resistor 48 was present during reset, the "Q" output of latch 52 will be low and that will cause a multiplexer 54 to select an address line 56. Appropriate care is taken to insure that no race problems are created between the internal pull-up turning off and latch 50's set-up time and hold-time. An exclusive-or gate 58 will drive the tag compare line 60 permanently true. The net effect of the presence of the resistor 48 then is to disable the tag comparisons during operation.

If the resistor 48 was not present during reset, latch 50 will clock its "Q" output high. This in turn will cause the multiplexer 54 to select a buffered tag line 62 from the output of a buffer 64. Pin 46 is input to the buffer 64. During the operation phase of the cache tag comparator 10 a tag output enable line 66 will enable a buffer-driver 68. Buffer-driver 68 will thereby place the physical address on pin 46. During tag comparison, buffer-driver 68 will be disabled and the tag returned to pin 46 will be compared to line 56 in the exclusive-or gate 58. The match will be output on tag compare line 60.

To allow programing of pin 46 the transistor 44 is added which is active during reset (conducting) and is turned off (high impedance) after reset. Thus if the resistor 48 is placed on pin 46 it can be sensed as a low voltage. An absence of resistor 48 is sensed as a high voltage. The presence of resistor 48 is an indication of the line not to be used in bit comparison. The current sourced externally during the reset period is preferably 10 $\mu$A minimum, 100 $\mu$A maximum, with a reset time of 25 $\mu$s minimum that provides for an RC-time constant of the resistor 48 and the capacitor 50.

The proper value of the resistor 48 must be carefully calculated. The following equations are used in computing resistor 48's value:

$$V_{external} = I_{reset} * R_{ext} \qquad (1)$$

$$V_{il} = V_{cc} * e^{-t/(Rext * Cload)} \qquad (2)$$

$$I_{reset} = C_{load} * dV/dt \qquad (3)$$

From a system point of view, it is desirable to use as large a resistor as possible to pull down the pin 46, since resistor 48 will always cause a current flow when pin 46 is output high. This current will be:

$$I = V_{cc}/R_{ext} \qquad (4)$$

For 10 k$\Omega$, this current is 0.5 mA. However, this would imply that $I_{reset}$ maximum would be 40 $\mu$A (equation 1). A specification of 10 $\mu$A minimum, 100 $\mu$A maximum, is very practical. This implies a maximum resistor of 4 k$\Omega$, and a current flow of 125 mA when the pad is output high.

The last two equations determine the reset period required to insure that the desired voltage level is seen at pin 46. The worst case reset period is determined by minimum $I_{reset}$ and maximum $C_{load}$, while maximum $R_{ext}$ is determined by maximum $I_{reset}$. Nominal values indicate a 4 k$\Omega$ resistor 48, 80 pF capacitive load of capacitor 50, and a 100 $\mu$s reset time.

One has to be concerned with the values of resistors used and the signal capacitance assumptions. Assume that the deselected tags are still used as outputs for address decoding. Then the processor could output the signal as a high, just prior to reset. The resistor value must be capable of allowing this high-voltage to decay to a low value during the reset period. Equation 2 dictates that:

$$0.4 = 5 \ e^{(-1/R_{ext} * C_{load})} \qquad (5)$$

If $C_{load} = 80$ pF, $R_{ext} = 4$ k$\Omega$, then $t = -R_{ext} * C_{load} * \ln(0.4/5.0) = 80$ $\mu$Seconds for the reset period.

If no resistor 48 is used as a pull-down, and the signal was driven to ground just prior reset, then the signal must float to $V_{ih}$ in order to be properly sampled at the end of the reset period. Equation 3 indicates that:

$$T_{reset} = C_{load} * (V_{ih} - V_{ss})/I_{reset} \qquad (6)$$

If $I_{reset}$ is a minimum of 10 $\mu$A, then $T_{reset} = 20$ $\mu$Seconds.

Thus, the transistor 44 should always source current in the range of 10 $\mu$A to 100 $\mu$A. $T_{reset}$ must be greater than 100 $\mu$Sec, and the maximum value of pull-down resistor 48 allowed is 4 k$\Omega$.

The low input voltage level, $V_{il}$, at pin 46 targets 0.4 V instead of the 0.8 V normal value—that builds in a 2:1 margin. Capacitive drive of 80 pF exceeds anything expected in a system which only uses tags for address decoding. The range of 10 $\mu$A to 100 $\mu$A for the reset current is easily achievable by current design engineering methods.

The configuration of FIG. 1 reduces system cost by eliminating the parity and tag bits from the fast local memory (cache), and it increases the amount of fast local memory possible such that some applications can use it as the sole random access memory in the system.

The tag pins, shown as pin 46 in FIG. 2, are both input and output and therefore could not be tied to ground and $V_{cc}$ like other unused inputs. By testing for the presence of a resistor 48 initial reset time, the RC effect is experienced once and not on each cycle because during tag comparison phase of the cycle the inputs are ignored.

The device configurations in FIGS. 1-2 eliminate the requirement for a 60-bit value from the cache subsystem on every cache access. This 60-bit value usually includes the 32-bit data item, 4-bits of parity, a 20-bit tag value, a valid bit, and parity over the tag. The 60-bit value was required regardless of the particular system being designed. Systems with larger caches or a smaller cacheable memory space were required to provide the same amount of data as systems with small caches and a large cacheable memory space. Here, there is no requirement for tag parity, data parity is made optional, and the number of tags to compare is determined by the system designer.

In addition to the elimination of the logic in the ID79R3000 based system to ignore unneeded tags, further cost savings are achieved in the preferred embodiment of FIGS. 1-2. This is due to the elimination of data and tag parity. Usually, data and tag parity require 7-bits from each cache. The preferred embodiment system eliminates the requirement for a total of four 7198 type devices, which are typically required to support these parity bits. Thus, the preferred embodiment is expected to yield substantial cost savings relative to equivalent IDT79R3000-based systems. Specifically, the preferred embodiment eliminates 10 high-speed 7198's, plus 2 74FCT374A's relative to the "nominal" system. In a "cost reduced" system, the preferred embodiment eliminates 4 high-speed 7198's, one 74FCT244A, two 74FCT821A's, and 2 74FCT374A's, representing substantial savings over the least expensive IDT79R3000-based system.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A processor including a cache tag comparator connected to receive cache hit/miss information in parallel on a plurality of miltiplexed input/output (I/O) pins with at least one of the I/O pins having a programmable latch for disabling a corresponding bit of the cache hit/miss information, said programmable latch comprising:

current source means for sourcing a current to said programmable I/O pin such that an externally connected resistor means between a ground reference and said programmable I/O pin may conduct said current during reception of a reset signal on a reset line within the processor;

latching means for storing a digital bit representing whether or not a voltage read from said programmable I/O pin indicated said externally connected resistor was present or not at the end of said reset signal; and matching means for returning a cache tag bit match indication to the cache tag comparator when the latching means has stored said digital bit in a first state and for communicating the status of said programmable I/O pin when the latching means has stored said digital bit in a second state.

2. The processor of claim 1, wherein:

the current source means sources a current in a range of ten microamperes to one hundred microamperes.

3. The processor of claim 1, wherein:

the latching means receives said reset signal on said reset line for a minimum of one hundred microseconds.

4. The processor of claim 1, wherein:

the current source means sources a current sufficient to charge an external capacitance of approximately eighty picofarads connected to said programmable I/O to above a 0.4 volt input voltage level in one hundred microseconds.

5. The processor of claim 1, wherein:

the current source means comprises a transistor for connecting a supply Vcc to said programmable I/O pin and is controlled by a gate connected to said reset line;

the latching means comprises a D-type flip-flop connected to be clocked by said reset signal and receive data from said programmable I/O pin; and the matching means comprises an exclusive OR-gate and muliplexer controlled by the latching means.

* * * * *